Sept. 12, 1967  C. J. McMANUS  3,341,428
REFINERY ARRANGEMENT
Filed June 10, 1964  3 Sheets-Sheet 1
FIGURE I
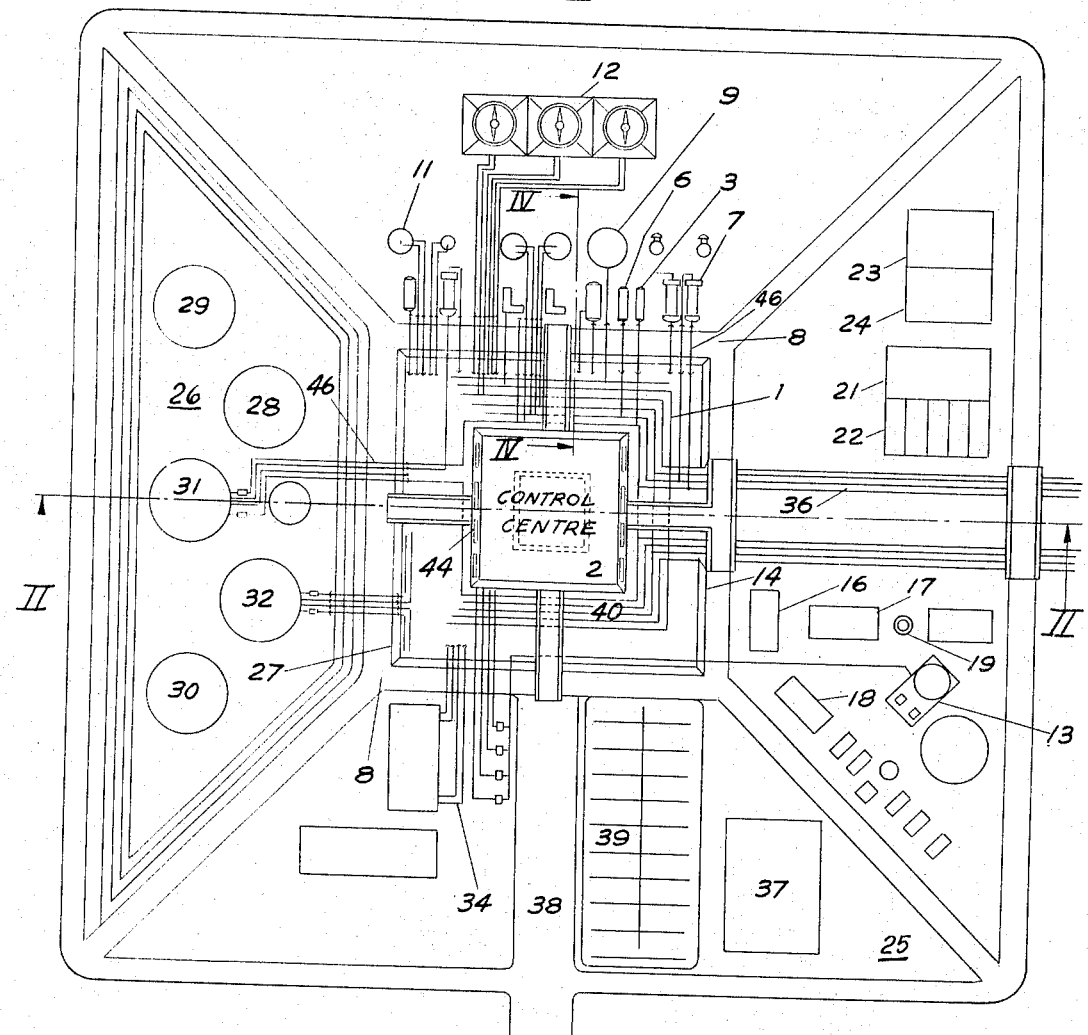
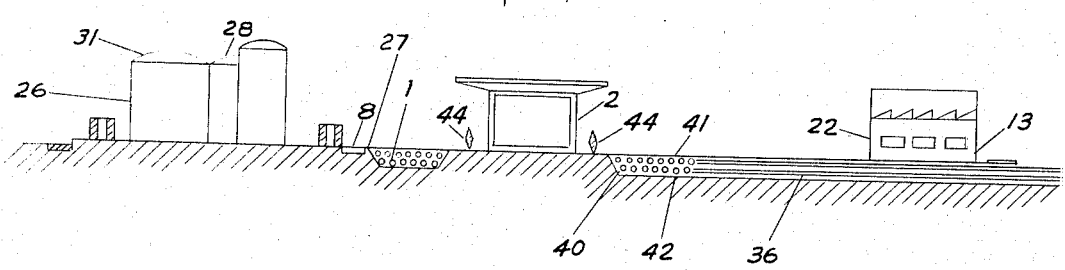
FIGURE II
INVENTOR
CALVIN J. McMANUS
BY
ATTORNEY

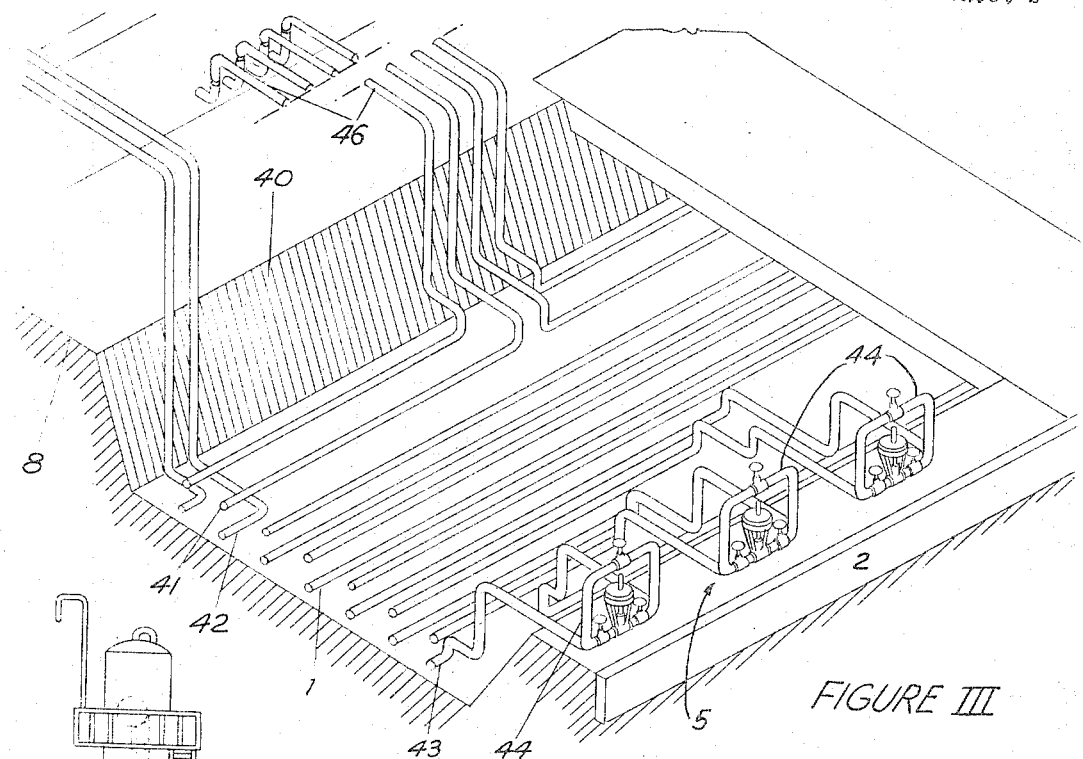
FIGURE III
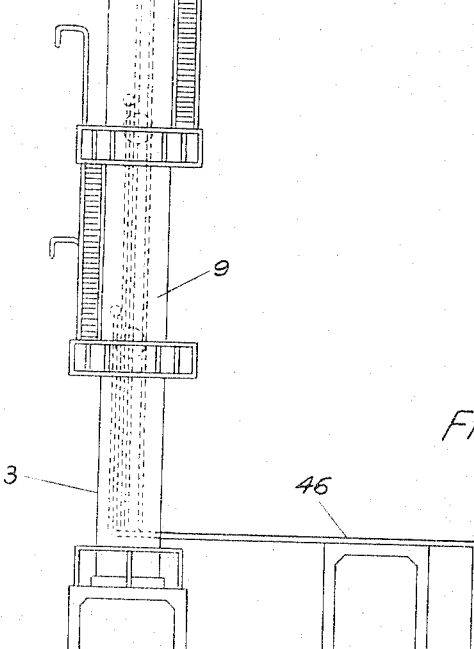
FIGURE IV
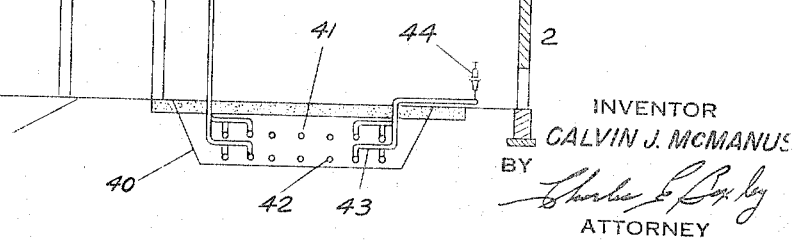

Sept. 12, 1967  C. J. McMANUS  3,341,428
REFINERY ARRANGEMENT
Filed June 10, 1964  3 Sheets-Sheet 3
FIGURE V
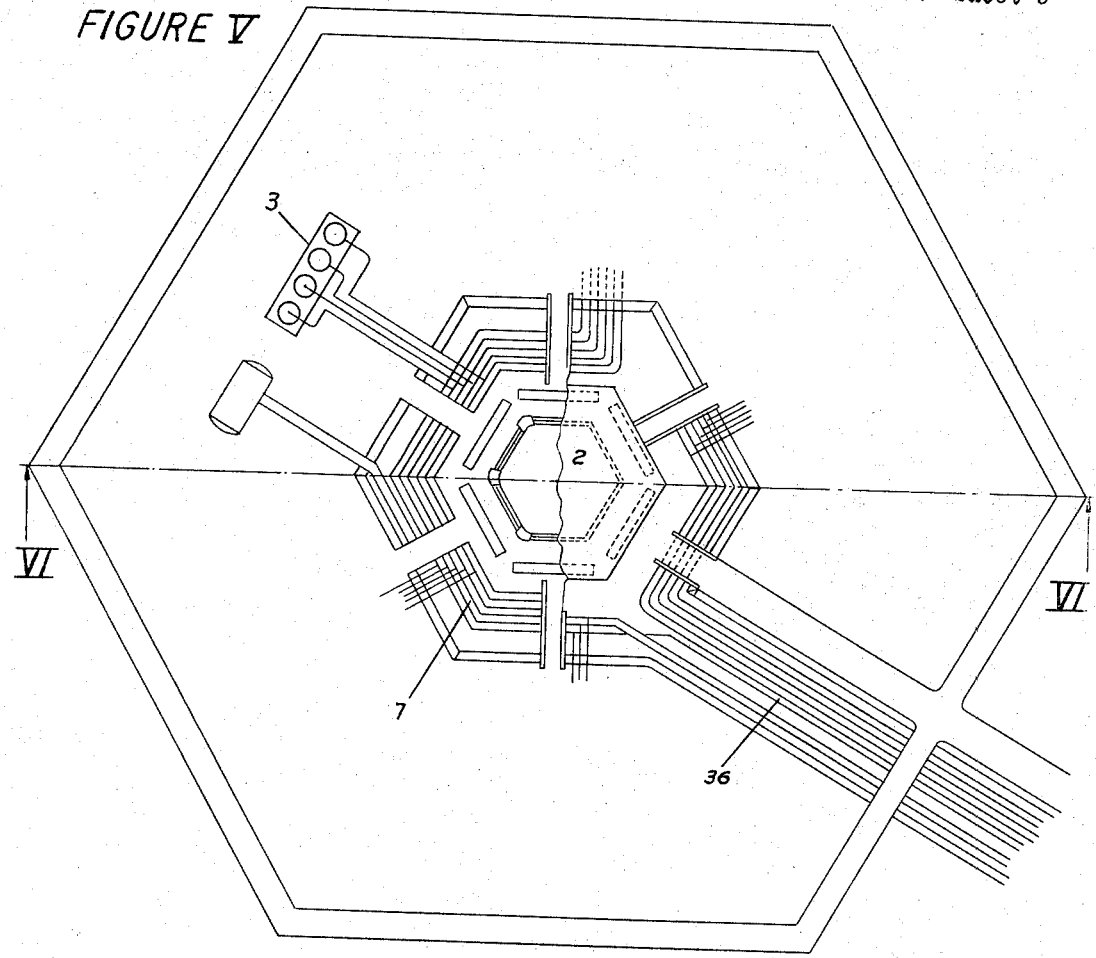
FIGURE VI
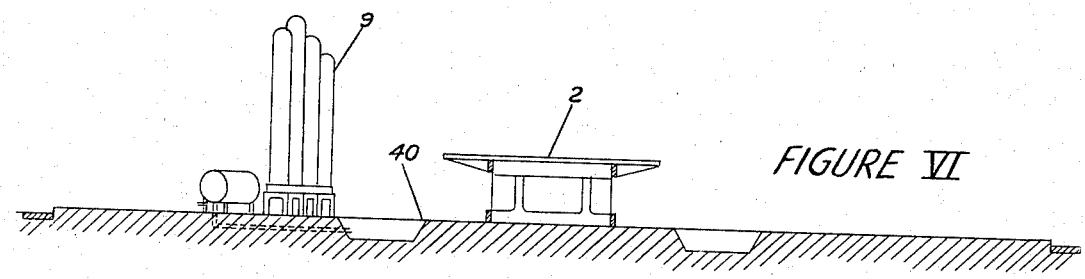
INVENTOR
CALVIN J. McMANUS
BY
ATTORNEY

United States Patent Office 3,341,428
Patented Sept. 12, 1967

3,341,428
REFINERY ARRANGEMENT
Calvin J. McManus, East Orange, N.J., assignor to Foster Wheeler Corporation, Livingston, N.J., a corporation of New York
Filed June 10, 1964, Ser. No. 374,034
2 Claims. (Cl. 196—46)

ABSTRACT OF THE DISCLOSURE

A control unit is geometrically located at the center-point of a polygon-shaped refinery. Each equal portion of the refinery contains some specific type of refinery equipment. A trough around the control unit houses the fluid-handling pipes and electrical conduits. Preferably the control unit, trough and refinery have the identical polygon shape. The entire refinery operation can be visually observed and controlled from the control unit so located.

---

This application is a continuation-in-part of co-pending application Ser. No. 200,181, filed June 5, 1962, now abandoned.

Petroleum refineries have become, with the increase in capacity, process development, and automation, extremely complex in design. Many miles of pipe run from one point to another within the refinery. Likewise, many miles of electrical conduit exist between remote process equipment and a control center. As the expense of building such a refinery is immense, it is highly desirable to design a refinery about a geometrical layout which offers economy of construction, versatility, and particularly ease of operation.

In accordance with this invention, a centrally located control unit is geometrically located within the center of a refinery. Although the term "central controls" has been known, it has not been known in the sense as used in this invention; that is, geometrically within the center of a refinery with the refinery having a specific shape. A refinery is laid out in polygon shape and the polygon is broken down into equal portions. Each portion of the refinery contains a specific type of refinery equipment. For example, processing equipment could be located in one portion, a utility plant in another, tankage in another, and perhaps administration buildings in still another. The control unit is located in the center of the polygon. Around the control unit a pipe channel is constructed. All pipes whether they be electrical conduit or fluid handling conduits are run as directly as possible from the unit to which they are connected to the pipe channel and through the pipe channel to a point directly adjacent whatever piece of apparatus or control equipment with which they are interconnected. Heavy valves are located around the outside of the control unit for convenience and electrical controls both manual and automatic are located within the control unit. By means of picture windows in the control unit, it is possible for an operator within the unit to observe not only what takes place upon the control panel, but also to physically view the entire refinery. The end result is a refinery system which is economical to construct and to operate.

It is therefore an object of this invention to provide an improved refinery arrangement.

Another object of this invention is to provide a refinery arrangement which is versatile and flexible for construction and operation.

Another object of this invention is to provide a refinery arrangement which is easily and economically constructed and operated.

Other objects and a fuller understanding of the invention may be had by referring to the following description and claims taken in conjunction with the accompanying drawings in which:

FIGURE I is a somewhat schematic plan for the refinery embodying the present invention.

FIGURE II is a sectional elevation taken along line II—II of FIGURE I.

FIGURE III is an isometric view illustrating the arrangement of valve stations, pipe entry to the upper and lower tiers of the pipe band, and passage over the roadway.

FIGURE IV is a sectional elevation view taken along the lines of IV—IV of FIGURE I.

FIGURE V is a plan view depicting a somewhat more complex embodiment of the invention.

FIGURE VI is a sectional elevation view taken along line VI—VI of FIGURE V.

FIGURE I depicts one particular embodiment of a refinery system in accordance with this invention. In FIGURE I the refinery is in the form of a square which, as is well-known, is a four-sided polygon. The control unit 2 is located geometrically at the center point of the square. The refinery is apportioned into four equal sections, each one representing a triangular portion of the total square. The triangles are formed by two equal diagonals, each extending from one corner of the square to the opposite corner. Located about the control unit 2 is a pipe band 1. The pipe band 1, is preferably of the same polygon shape as the control unit 2, which in the case of FIGURE I is a square. As shown in FIGURE III, between the pipe band 1 and control unit 2 are valve groups 5. The control unit 2 is preferably of the same polygon shape as the refinery. The valves in valve groups 5 are located directly in front of the control unit 2 to permit operation by merely stepping outside. The portion of the refinery generally designated 3 may be used for a processing group. Among typical processing elements included in such a group are pumps 6 and heat exchangers 7 which are shown located across a service road 8 from the pipe band 1. In this location the pumps 6 and heat exchangers 7 are convenient for maintenance purposes and towers 9 and heaters 11 are spaced outwardly therefrom. Air coolers 12 are disposed in the most remote position from the control unit 2. Of course, various other process elements may be employed in a commercial refining process to which this invention may be suitable.

In another portion of the refinery area, a utility plant group generally designated 13 is located. Among the utility plants elements typically included in this group are feed water purification and storage equipment 16, boilers 17, a generator 18, and a stack 19; a warehouse 21, shops 22, garage 23 and a fire house 24 are also conveniently arranged within the utility plant group.

In a portion of the refinery generally designated 26 tank facilities are located. Among typical tanks included in group 26 are those devoted to storing such products as reformer feed 28, premium gasoline 29, diesel fuel 30, regular gasoline 31, and kerosene 32. Blending facilities, generally designated 34, are also provided. Outlet lines 36 provide communication with a terminal facility.

Of course, various other process elements employed in any commercially accepted refinery process may be suitable to this refinery layout.

The portion of the refinery not accounted for which has been generally designated 25 may be used for an administrative building 37, an access road 38, and a parking lot 39.

As best seen in FIGURES III and IV, the pipe band 1 is disposed in a trough 40. Within trough 40 is an upper pipe tier 41 and a lower pipe tier 42. Connection with the lower pipe tier 42 is made by an intermediate pipe layer 43. Valve groups 5 include individual valves 44 which are arranged about the control centers. The service road 8 is crossed by way of a loop 46. The pipes located within the trough 40 are either fluid handling conduits or electrical conduits which interconnect between the various refinery equipment, the control tower, and other refinery equipment.

It should be realized that the novel features of this invention lie in the geometrical arrangement of a control unit 2 and the interconnection both electrically and mechanically of the refinery equipment by means of channel 1 located around the control unit 2. The exact manner in which the equipment is connected and used depends upon the exact refinery operation desired. Such arrangements are well-known in the art and are not a part of this invention.

Although the invention is described in its preferred form with a certain degree of particularity, it is understood that the present disclosure of the preferred form has been made only by the way of example and that numerous changes in the details of construction and the combination and arrangements of parts may be resorted to without departing from the spirit and the scope of the invention, as hereinafter claimed.

What is claimed is:

1. A control arrangement comprising a petroleum refinery system in a refining area:
    a control unit geometrically located in a substantially central position with respect to the refinery system in the refinery area of polygon shape, said refinery area being proportioned into equal area portions corresponding to each side to said polygon shape; each portion being adjacent a side of said control unit for visual inspection from said control unit, said control unit having a polygon shape identical with and concentric of said refinery area polygon shape;
    valves for controlling the flow of fluid through said refinery system located adjacent said control unit in at least one of said area portions;
    electrical refinery controls located within said control unit; and
    a trough having a polygon shape identical with said control unit located annularly about the periphery of said control unit, said trough having two tiers of pipes and electrical conduits located within said trough, said pipes and conduits interconnecting refinery equipment and said electrical refinery controls and said valves for operation of said refinery system.

2. An arrangement according to claim 1 wherein said control unit is of polygon shape and said refinery area is of identical square polygon shape concentric with said control unit.

References Cited
UNITED STATES PATENTS

| | | | |
|---|---|---|---|
| 1,259,786 | 3/1918 | Seeger | 196—132 X |
| 1,616,515 | 2/1927 | Swoboda et al. | 196—132 X |
| 1,746,915 | 2/1930 | Taber | 196—46 |
| 1,770,213 | 7/1930 | Matlock | 196—132 |
| 3,039,565 | 6/1962 | Egner | 186—1 |

OTHER REFERENCES

"Petroleum", by G. A. Purdy (1958), p. 234.

American Petroleum Refining (Bell), 4th Edition (1959), pp. 406–408.

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,341,428                              September 12, 1967

Calvin J. McManus

It is hereby certified that error appears in the above numbered patent requiring correction and that the said Letters Patent should read as corrected below.

Column 2, line 50, for "21" read -- 24 --; line 51, for "24" read -- 21 --; column 3, line 30, for "to", second occurrence, read -- of --; same line 30, for "shape;" read -- shape, --.

Signed and sealed this 3rd day of December 1968.

(SEAL)
Attest:

Edward M. Fletcher, Jr.                        EDWARD J. BRENNER

Attesting Officer                                  Commissioner of Patents